(12) United States Patent
Anderson (10) Patent No.: US 9,482,500 B1
(45) Date of Patent: Nov. 1, 2016

(54) MARITIME EMERGENCY CABLE CUTTER

(71) Applicant: Steven E. Anderson, Fredericksburg, VA (US)

(72) Inventor: Steven E. Anderson, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 65 days.

(21) Appl. No.: 14/542,416

(22) Filed: Nov. 14, 2014

(51) Int. Cl.
*F42B 3/00* (2006.01)
*F42D 3/00* (2006.01)

(52) U.S. Cl.
CPC .. *F42B 3/00* (2013.01); *F42D 3/00* (2013.01)

(58) Field of Classification Search
CPC .............. F42B 3/08; F42B 1/02; F42D 3/00; E21B 43/117; B23D 15/145; B23D 21/14
USPC .......................................................... 89/1.14
See application file for complete search history.

(56) References Cited

U.S. PATENT DOCUMENTS

| | | | | |
|---|---|---|---|---|
| 3,036,522 A | * | 5/1962 | Lindsey | 166/54.6 |
| 3,089,417 A | * | 5/1963 | Beyer et al. | 102/307 |
| 3,765,333 A | * | 10/1973 | Reed et al. | 89/1.14 |
| 4,185,551 A | | 1/1980 | Drimmer et al. | 102/15 |
| 4,793,385 A | | 12/1988 | Dyer et al. | 140/123.6 |
| 6,843,157 B2 | | 1/2005 | Hamilton et al. | 83/639.4 |
| 7,963,319 B2 | | 6/2011 | Daigle et al. | 166/54.5 |
| 8,290,328 B2 | | 10/2012 | Tatat et al. | 385/134 |

FOREIGN PATENT DOCUMENTS

DE 102 51 676 * 5/2004

OTHER PUBLICATIONS

NWP 4-01.4 "Underway Replenishment", 2-1-2-3, 2-11, 2-12, 3-7-3-9, 4-1, 4-2, 4-6-4-8, 5-32, 6-7, 6-8 (Mar. 2001). http://www.hsna.org/doc/pdf/unrep-nwp04-01.pdf.

* cited by examiner

*Primary Examiner* — Stephen M Johnson
(74) *Attorney, Agent, or Firm* — Gerhard W. Thielman, Esq (57) ABSTRACT

A marine cable cutter is provided for wirelessly severing wire responsive to an electromagnetic command signal. The cutter includes an explosive package for wrapping around the wire, and a clamshell case for containing the package around the wire. The package includes a wireless receiver to receive the command signal, an electric pulse generator triggered by the receiver, an explosive initiated by the generator, and a platform for containing the receiver, generator and explosive. The clamshell case includes a pair of envelopes connected along mutual first edges by a hinge and mutual second edges by respective clamps. The envelopes pivot on the hinge to open and receive the package with disposal of the wire therein, and subsequently to close and secure by the clamps. The envelopes can be composed of sheet metal with the clamps being flanges with aligned holes for receiving bolt fasteners.

8 Claims, 7 Drawing Sheets

MARITIME EMERGENCY CABLE CUTTER

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to maritime cable cutting under emergency conditions. In particular, the invention relates to a mechanism to expeditiously and reliably sever a heavy-duty cable used between ships for supply operations.

Naval ship replenishment at sea, also known as an undersea replenishment (UNREP) operation, involves rendezvous of approach and control ships on parallel courses, followed by connection of ships by a span cable. For liquid supplies, e.g., fuel, the delivering ship extends a hose along the cable to the receiving ship for connection to the appropriate receptacle. Other supplies, such as weapon stores can also be exchanged via cable suspension.

Figure 1:
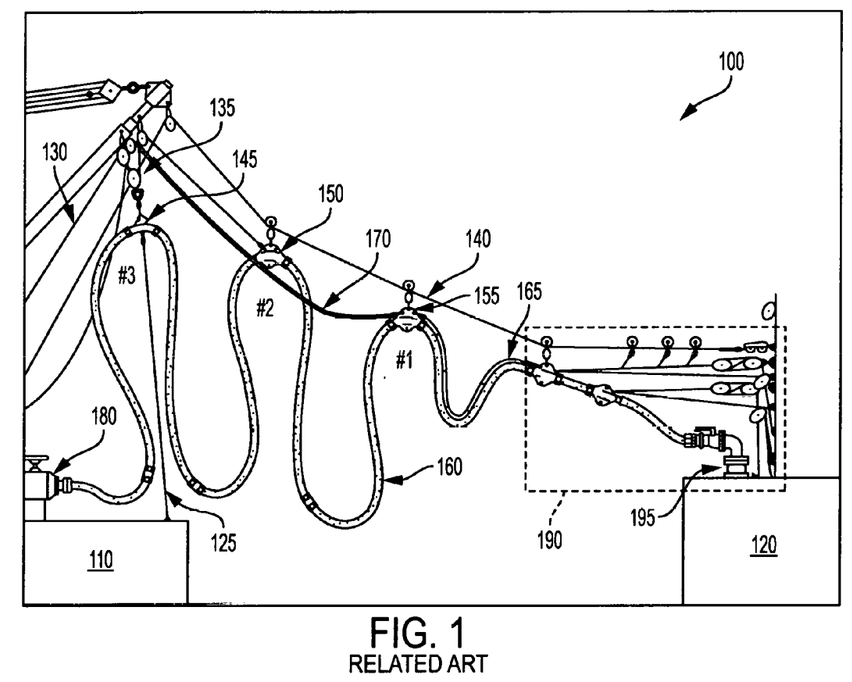
FIG. 1 is an elevation view of a first conventional UNREP configuration.

FIG. 1 shows an elevation view 100 of a conventional rigging configuration for UNREP between a delivering ship 110 and a receiving ship 120 for refueling operation. Structures and supports on the delivering ship include a wire topping pendant 125, a wire saddle whip 130, and an anti-toppling device 135. A span wire or cable 140 supports an inboard saddle 145, operating in conjunction with mezzanine and outboard saddles 150 and 155. The span wire 140 is typically 1⅜ inches (") thick and comprises braided steel cable resistant to spontaneous breakage. The saddles 145, 150 and 155 elevate a supply hose 160 accompanied by a stress wire 165. After refueling completion a retrieving line returns the outboard saddle 155 to the delivering ship 110. A supply outlet 180 delivers fuel through the hose 160 supported by a receiving structure 190 on the delivery ship 120 and connected to its receiver inlet 195.

Figure 2:
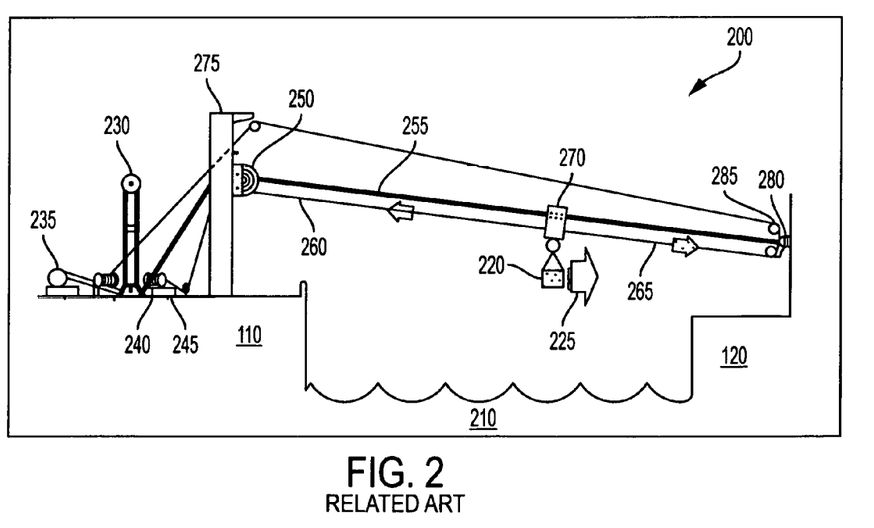
FIG. 2 is an elevation view of a second conventional UNREP configuration.

FIG. 2 shows an elevation view 200 of a conventional rigging configuration for weapons transfer between the delivering and receiving ships 110 and 120 to transfer a load 220 along a travel direction 225. The delivering ship 110 includes a ram tensioner 230, a high line winch 235, and out-haul winch 240, an in-haul winch 245 and a transfer head 250, which holds a tensioned highline 255, a tensioned in-haul line 260, and a tensioned out-haul line 265. The highline 255 and in-haul line 260 enable a trolley 270 to transfer the load 220. The delivering ship 110 also includes a kingpost 275 to elevate the transfer head 250. The receiving ship 120 includes a padeye 280 with an out-haul fairlead 285 to support the lines 255, 260 and 265.

Figure 3:
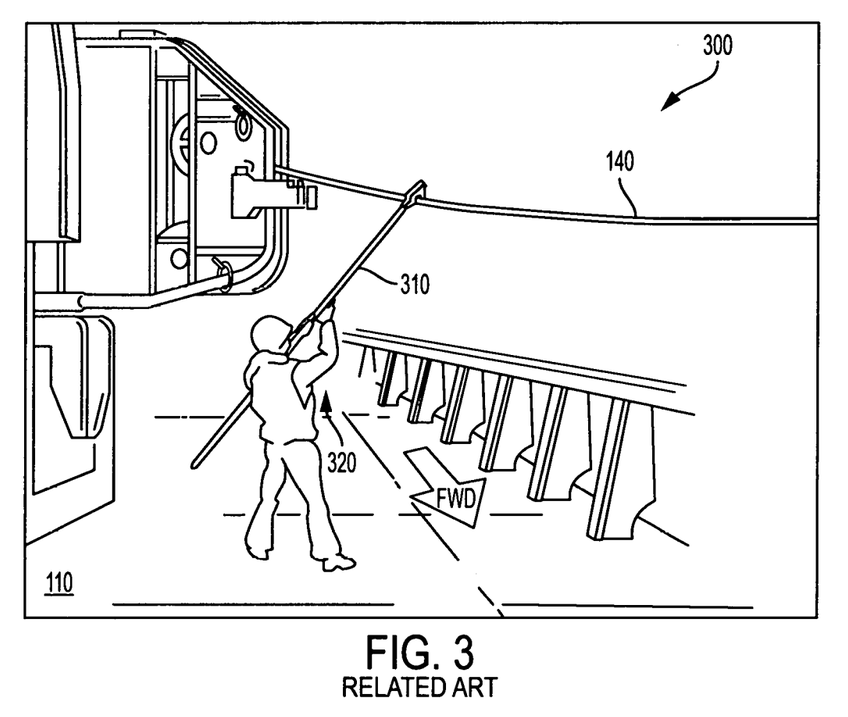
FIG. 3 is a perspective view of a conventional cable severing process.

In the event of an emergency replenishment termination, the cable is severed manually. This process is described in section 2.2.11 of "Underway Replenishment" especially pp. 2-11 through 2-15, issued as NWP 4-01.4 under the Chief of Naval Operations and available at http://www.hnsa.org/doc/pdf/unrepnwp04-01.pdf. FIG. 3 shows a perspective view 300 of the inboard ship 110 with its span wire 140. A manual cable cutter 310 is positioned on the span wire 140 by an assigned operator 320 to sever the cable when authorized during an emergency and abort the inter-ship delivery operations.

SUMMARY

Conventional emergency severance devices for marine cables yield disadvantages addressed by various exemplary embodiments of the present invention. In particular, various exemplary embodiments provide a marine cable cutter for wirelessly severing wire responsive to an electromagnetic command signal. The cutter includes an explosive package for wrapping around the wire, and a clamshell case for containing the package around the wire.

In exemplary embodiments, the package includes a wireless receiver to receive the command signal, an electric pulse generator triggered by the receiver, an explosive initiated by the generator, and a platform for containing the receiver, generator and explosive. In further exemplary embodiments, the clamshell case includes a pair of envelopes connected along mutual first edges by a hinge and mutual second edges by respective clamps. The envelopes pivot on the hinge to open and receive the package with disposal of the wire therein, and subsequently to close and secure by the clamps. The envelopes can be composed of sheet metal with the clamps being flanges with aligned holes for receiving bolt fasteners.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

Figure 4A:
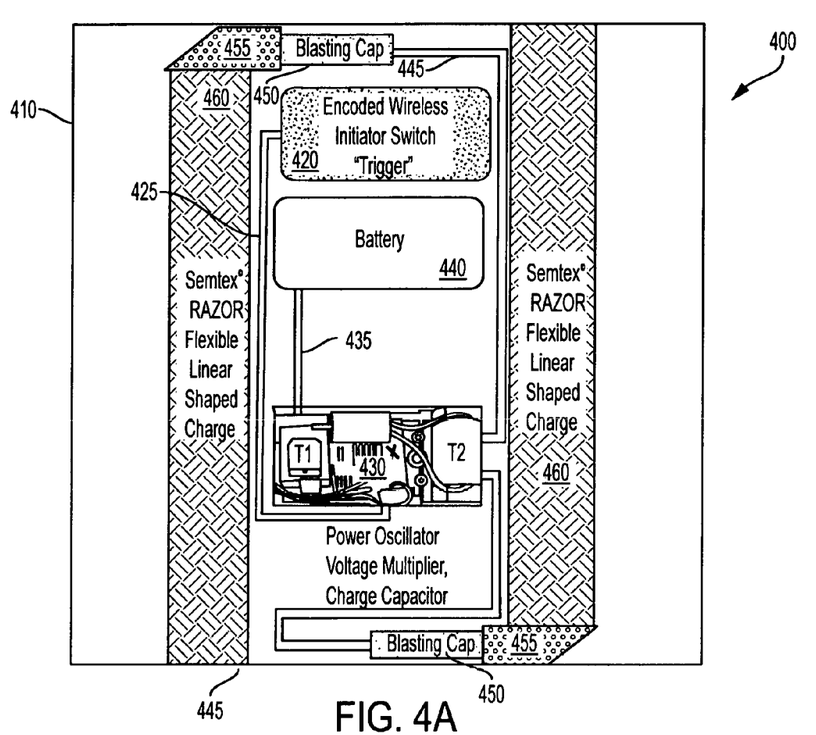
FIG. 4A is a plan view of an exemplary wireless explosive package.

FIG. 4A shows a plan view 400 of a wireless explosive package for an exemplary emergency cable cutter. A foam rubber block 410 provides a substrate structure for the package, into which cavities can be excised to disposal therein. Within the block 410 can be included a wireless trigger switch 420 connected by first electric wires 425 to a power oscillator 430 and second electric wires 435 to a battery 440. The power oscillator 430 boosts voltage from the battery 440 and connects a third electric wires 445 to a provides a high voltage pulse to a pair of blasting caps 450 on opposite sides of the block 410. The block 410 is preferably flexible, such as comprising foam rubber.

Figure 4B:
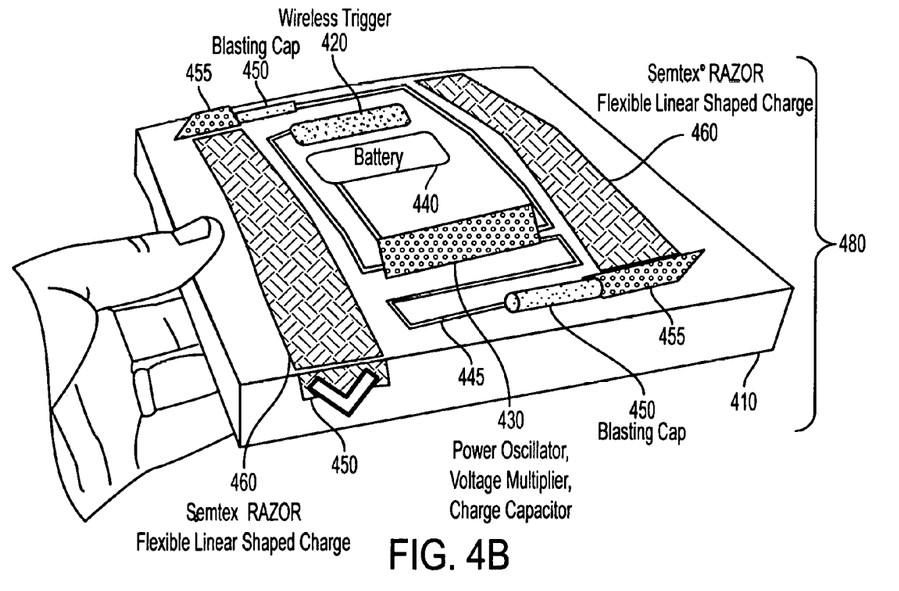
FIG. 4B is a perspective view of the wireless explosive package.

Upon initiation, the caps 450 explode with the resulting shock transmitted via corresponding blast igniters 455 to respective linear shaped charges 460 that direct their explosive forces to the span wire 140 for severance on command from a wirelessly transmitted signal. Example charges 460 can be commercially available Semtex® RAZOR flexible explosives. FIG. 4B shows a perspective view 470 of the exemplary package 480 showing the configuration of the shaped charges 460 as a right angle to direct their blasts upward relative to the block 410 orientation.

Figure 5:
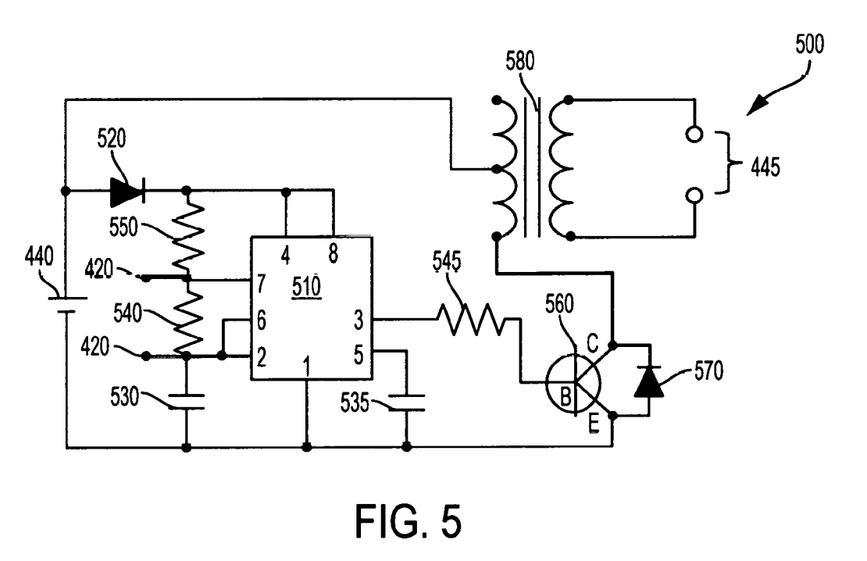
FIG. 5 is a diagramic view of an electronics control for the package.

FIG. 5 shows a circuit diagram view 500 of an exemplary power oscillator 430. The electronics form resembles a stun gun for purposes of producing a high voltage pulse. A "555" timer integrated circuit 510 provides a switchable control with pins 1 (ground), 2 (trigger), 3 (output), 4 (reset), 5 (control voltage), 6 (threshold comparator), 7 (discharge) and 8 (voltage supply). Pins 2 and 7 connect to the switch 420, and pins 1 and 8 connect respectively to the negative and positive terminals of the battery 440, with a switch diode 520 interposing between pin 8 and the battery 440.

The timer circuit 510 also connects to capacitors 530 and 535, and to resistors 540, 545 and 550. Output pin 3 connects via the resistor 545 to an NPN transistor 560 in parallel with a rectifier diode 570, which together with the battery 440 connect to input terminals of a voltage transformer 580. The output terminals of the transformer 580 provide the high voltage pulse to the caps 445.

Preferably, the switch diode 520 can, for example, be either 1N914 or 1N4148. The capacitor 530 is 0.1 µF or 0.47 µF, while the capacitor 535 is 0.01 µF. The resistors 540 and 545 are 1 kΩ each; the resistor 550 is 47Ω. The transistor is a TIP31 bipolar junction transistor with current flowing from collector (C) to emitter (E) when base (B) has higher voltage than emitter (E). The transformer 580 constitutes a miniature audio transformer receives input voltage from the battery 440 on the 1 kct (one-thousand loop) center-tap left side and supplies output voltage to the caps 445 from the 200 k (0.2 million loop) right side.

Figure 6:
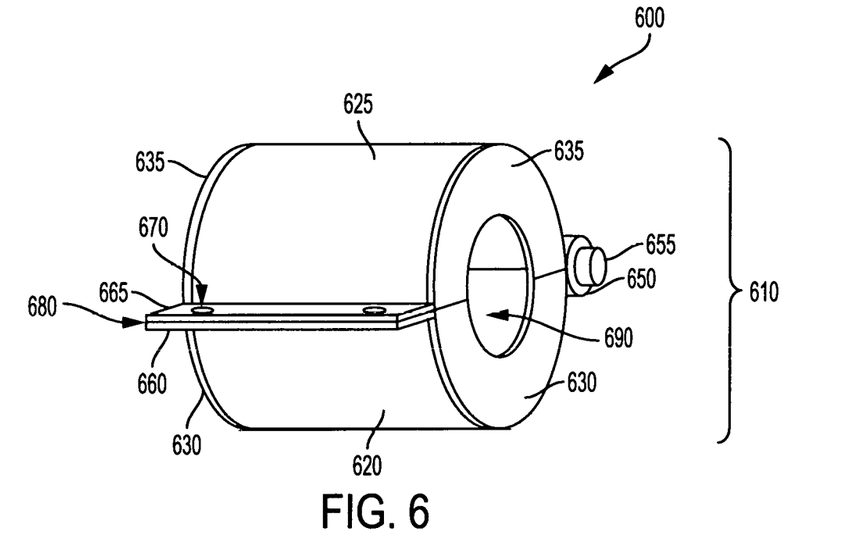
FIG. 6 is an isometric view of a cable case for the package.

FIG. 6 shows an isometric view 600 of a clamshell housing case 610 for containing the package 480 around the span wire 140. The case 610 can be substantially composed from sheet metal and includes radial semicircular frames to form an annular shell. The frames include lower and upper portions 620 and 625, conformably capped at the proximal end by respective fore plates 630 and 635, and at the distal end by respective aft plates 640 and 645.

The portions 620 and 625 pivot along a laterally disposed axis along a common hinge 650 secured by a rod 655. The portions 620 and 625 also join together laterally opposite the hinge 650 by respective flanges 660 and 665 that face each other. Each flange 660 and 665 has aligning through-holes 670 that to receive appropriate fasteners when they face each other along a common flat joint interface 680. The housing 610 encloses an interior 690 in which the package 480 can wrap around the span wire 140.

Figure 7:
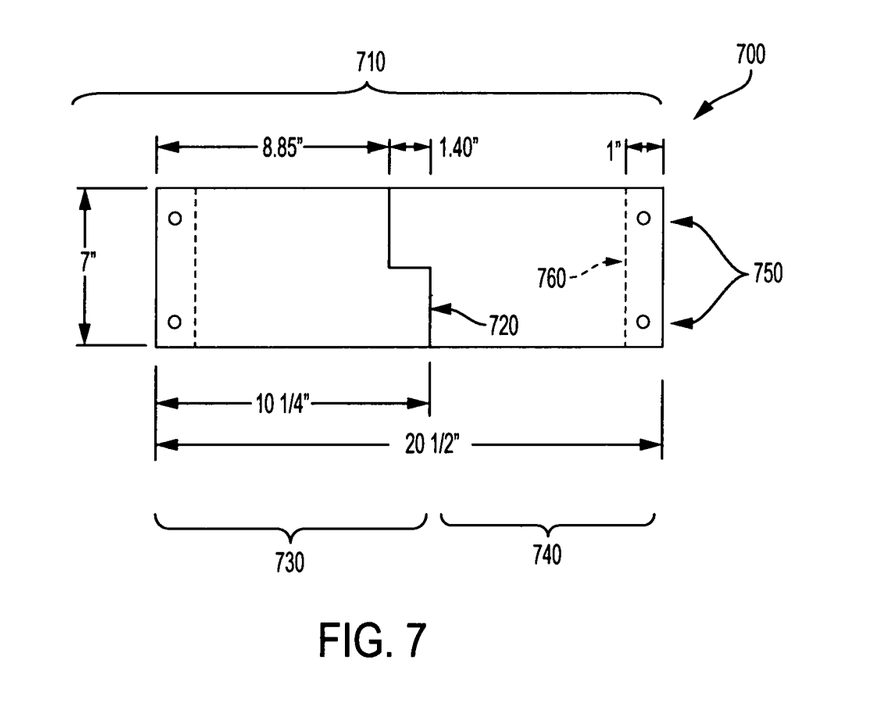
FIG. 7 is a plan view of a metal sheet for constructing the case.

FIG. 7 shows a plan view 700 of a flat metal rectangular sheet 710 preferably having an overall length of 20½" and width of 7" for constructing the upper and lower portions 620 and 625. The sheet 710 is cut along lines 725 to divide into left and right sections 730 and 740, each having lengths of on the 10¼" and 8.85" on opposite sides with a transitional middle section edge of 1.40". These sections 730 and 740 are designed to be identical and interchangeable for composing the portions 620 and 625. At the longitudinal edges, through-holes 750 are drilled and the ends are folded along line 760 for an edge length of 1".

Figure 8A:
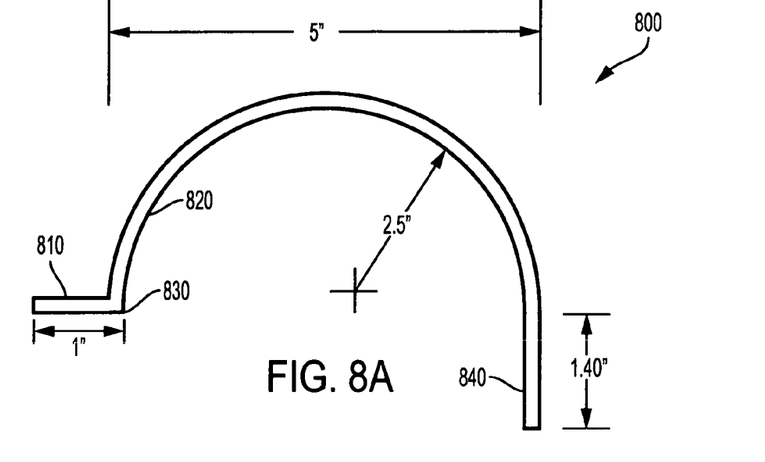
FIGS. 8A and 8B are elevation views of the metal sheet after shaping.
Figure 8B:
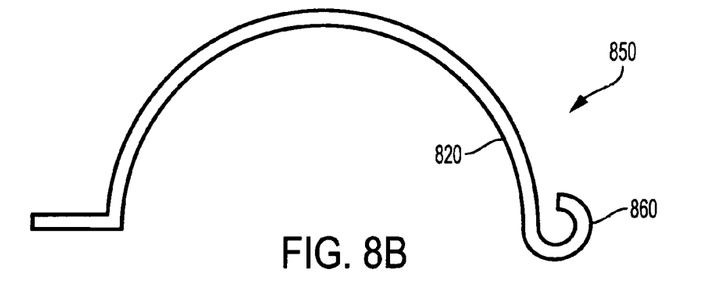

FIGS. 8A and 8B show elevation views of one of the metal sheet sections 730 and 740 further modified to form the portions 620 and 625. FIG. 8A illustrates an elevation view 800 of the modified section with a ledge 810 that forms one of the flanges 660 and 665. A semi-circular arc 820 joins the ledge 810 at a corner 830 formed along line 760. The arc 820 has a radius of 2½" and extends tangent as an extension 840 opposite the ledge 810. FIG. 8B illustrates another elevation view 850 of the modified section with the extension 840 curled to form a tight arc 860 that forms part of the hinge 650. Two such modified sections can be joined together and joined by the rod 655.

Figure 9:
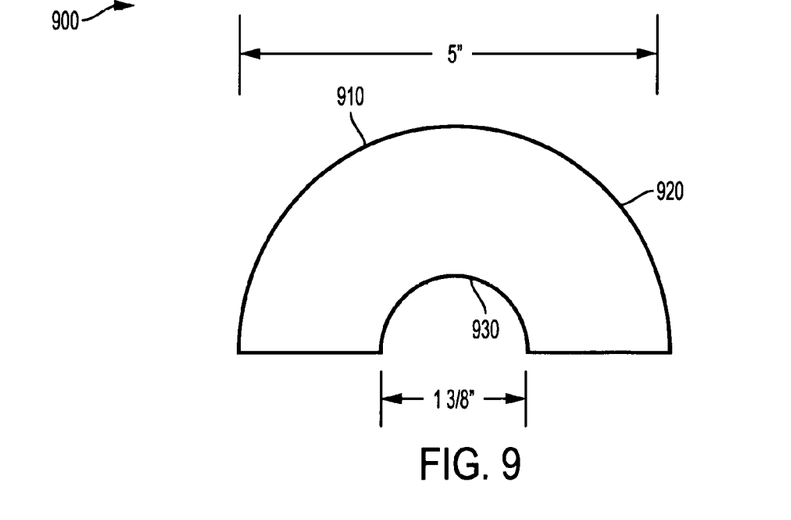
FIG. 9 is an elevation view of a sheet metal edge flange.

FIG. 9 shows a plan view 900 of a sheet metal plate 910 that forms any of the end plates 630, 635, 640 and 645. The plate 910 has an outer diameter of 5" and an inner diameter of 1⅜" for the span wire 140 to be contained along the length of the case 610. The outer diameter conforms to the arc 820 to provide closure between the portion 620 or 625 and the span wire 140.

Figure 10:
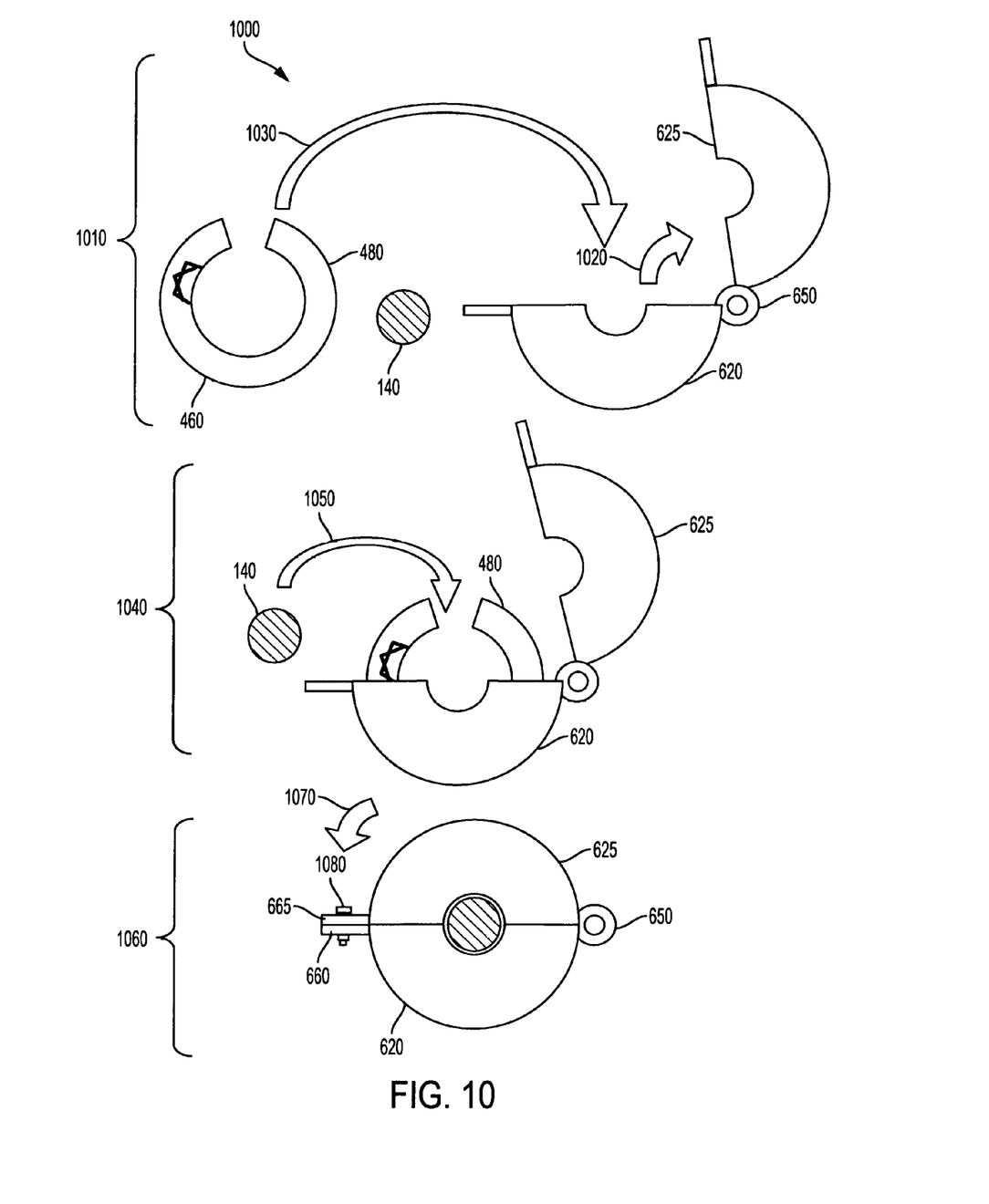
FIG. 10 is an elevation view of an exemplary installation operation.

FIG. 10 shows elevation views 1000 of the wireless cable cutter components and their assembly together with the span wire 140 (shown in cross-section). In first elevation view 1010, the upper portion 625 pivots 1020 along the hinge 650 relative to the lower portion 620 to open the case 610. While maintaining the shaped charge 460 straight, the package 480 can be curled for insertion 1030 into the interior of the case 610. In second elevation view 1040, the span wire 140 is disposed for insertion 1050 between the longitudinal sides of the package 480.

In third elevation view 1060, the upper portion pivots 1070 on the hinge 650 to close the case 610 and bolt fasteners 1080 insert into the aligned through-holes 660 of the flanges 660 and 665 facing each other. The flanges 660 and 665 with the fasteners 1080 constitute clamps for securing the case 610 upon closure, and alternative configurations can be contemplated without departing from the inventive scope. The completed and installed assembly can operate to sever the span wire 140 on command. Upon receiving an electromagnetic commanding signal from a ship-board transmitter, the trigger switch 420 can initiate a pulse from the oscillator 430 for discharging the caps 450 to detonate their charges 460.

The afore-described embodiments provide a mechanism to safely and reliably cut heavy braided steel span wires 140, in the event of an emergency during heavy underway replenishment operations. The objective is to fabricate an emergency-use explosive cable cutter (as in view 1060), which is safe, reliable, and can meet safety certifications necessary for shipboard use. Flexible linear shaped charges 460 represent an exemplary reliable method for cutting the braided steel span wire 140 (typically 1⅜" in diameter). Shipboard applications would enable minimization of fragmentation and blast effects from any explosive cable cutting system—while still ensuring effective use.

The exemplary embodiments provide a two-part modular assembly: first a heavy blast-resistant clamshell case 610, designed to easily clamp around and fasten onto the braided steel cable; and second, a flexible conformal cutting charge package 480, which readily inserts into the case 610. This package 480 contains the secure wireless remote detonation switch 420, a voltage multiplier-charge capacitor pulse generator 430, a long-life battery 440, two strips of flexible linear shaped charge 460 with industry-standard igniters 455 and blasting caps 450. In the event of an emergency, such as the fouling of cables interconnecting two ships 110 and 120 during UNREP in heavy seas, the UNREP supervisor could press a button to remotely trigger the explosive cable cutting device, and sever the fouled span wire 140 or other similar cable.

Within the United States joint and international military community, such a device would have general applicability to combat engineering brigades, and potentially for purpose applications faced by special operations forces. Building demolition companies could employ such a device for dismantling bridges, and other structures with steel reinforcement bar of significant dimensions.

Conventional explosive cable cutters are not approved for shipboard operation due to blast and fragmentation considerations. Mechanical cutting systems, e.g., electric drive or hydraulic drive, are relatively slow and require unacceptably many seconds (or minutes) to sever a heavy braided steel cable. Further, these systems require support systems such as electricity, wiring, hydraulics, and hydraulic lines. Reliability and maintenance of these electrical and hydraulic systems over the long-haul are perceived to be cost prohibitive, as well as creating additional ship modifications. The described exemplary designs provide an effective alternative for such emergency cable severing operations.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A marine cable cutter for wirelessly severing wire responsive to an electromagnetic command signal, said cutter comprising:
    an explosive package for wrapping around the wire, said package including a wireless receiver to receive the command signal, an electric pulse generator triggered by said receiver, an explosive initiated by said generator, and a platform for containing said receiver, generator and explosive; and
    a clamshell case for containing said package, said case including a pair of envelopes connected along mutual first edges by a hinge and mutual second edges by respective clamps, wherein said envelopes pivot on said hinge to open and receive said package with disposal of the wire therein, and subsequently to close and secure by said clamps.

2. The cutter according to claim 1, wherein said explosive is a shaped charge.

3. The cutter according to claim 1, wherein said platform is a foam rubber block within which to embed said receiver, said generator and said explosive.

4. The cutter according to claim 1, wherein said package further includes a blasting cap to receive said pulse from said generator and an initiator to channel a blast from said cap to said explosive for initiation to sever the wire.

5. The cutter according to claim 1, wherein said generator includes a battery for electrical source.

6. The cutter according to claim 1, wherein said case comprises sheet metal portions to cut, fold and bend, wherein said metal portions provide a longitudinal and radial chamber portions for containing said package and end plates.

7. The cutter according to claim 6, wherein said clamps include flanges with aligned holes on said portions and bolt fasteners for insertion into said holes.

8. The cutter according to claim 1, wherein said explosive includes a pair of shaped charge explosive charges.

* * * * *